(12) United States Patent
Totori et al.

(10) Patent No.: US 11,749,028 B2
(45) Date of Patent: Sep. 5, 2023

(54) ELECTRONIC DEVICE AND CONTROL METHOD THEREOF

(71) Applicant: CANON KABUSHIKI KAISHA, Tokyo (JP)

(72) Inventors: Yuki Totori, Tokyo (JP); Tomohiro Taguchi, Tokyo (JP); Hideta Nishizawa, Tokyo (JP); Shinya Nakano, Osaka (JP); Shogo Fujiwara, Tokyo (JP); Hiroaki Kubo, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 137 days.

(21) Appl. No.: 17/175,443

(22) Filed: Feb. 12, 2021

(65) Prior Publication Data

US 2021/0264143 A1    Aug. 26, 2021

(30) Foreign Application Priority Data

Feb. 25, 2020 (JP) .................. 2020-029740

(51) Int. Cl.
| | |
|---|---|
| G06V 40/20 | (2022.01) |
| G06V 40/10 | (2022.01) |
| G06V 20/64 | (2022.01) |
| G06V 10/10 | (2022.01) |
| G06V 40/60 | (2022.01) |

(52) U.S. Cl.
CPC ............. *G06V 40/23* (2022.01); *G06V 10/10* (2022.01); *G06V 20/64* (2022.01); *G06V 40/103* (2022.01); *G06V 40/20* (2022.01); *G06V 40/67* (2022.01)

(58) Field of Classification Search
CPC ...... G06V 40/103; G06V 20/64; G06V 10/10; G06V 40/20; G06V 40/67; G06V 40/23
See application file for complete search history.

(56) References Cited

U.S. PATENT DOCUMENTS

| | | | | |
|---|---|---|---|---|
| 10,796,489 | B1* | 10/2020 | Cordes | A63F 13/213 |
| 2013/0179288 | A1* | 7/2013 | Moses | G06V 40/103 |
| | | | | 705/26.1 |
| 2014/0198962 | A1* | 7/2014 | Anabuki | G06T 7/0014 |
| | | | | 382/128 |
| 2016/0371542 | A1* | 12/2016 | Sugita | G06T 19/00 |
| 2019/0307394 | A1* | 10/2019 | Yip | A61B 5/296 |
| 2020/0170608 | A1* | 6/2020 | Makino | A61B 6/4458 |
| 2020/0306982 | A1* | 10/2020 | Itou | B25J 9/1697 |
| 2021/0264813 | A1* | 8/2021 | Tanaka | G09B 19/24 |
| 2022/0138982 | A1* | 5/2022 | Ohashi | G06V 40/23 |
| | | | | 382/103 |

FOREIGN PATENT DOCUMENTS

JP    2017-004464 A    1/2017

* cited by examiner

*Primary Examiner* — Santiago Garcia

(74) *Attorney, Agent, or Firm* — Canon U.S.A., Inc. IP Division

(57) ABSTRACT

An electronic device includes an acquiring unit configured to acquire a positional relationship between a subject and the electronic device, a normalization unit configured to normalize posture information of the subject based on a positional relationship acquired by the acquiring unit and a controlling unit configured to perform control to perform predetermined notification in a case where posture information of the subject that is normalized satisfies a predetermined condition, and control not to perform the predetermined notification in a case where posture information of the subject that is normalized is not the predetermined posture.

20 Claims, 7 Drawing Sheets

FIG.5
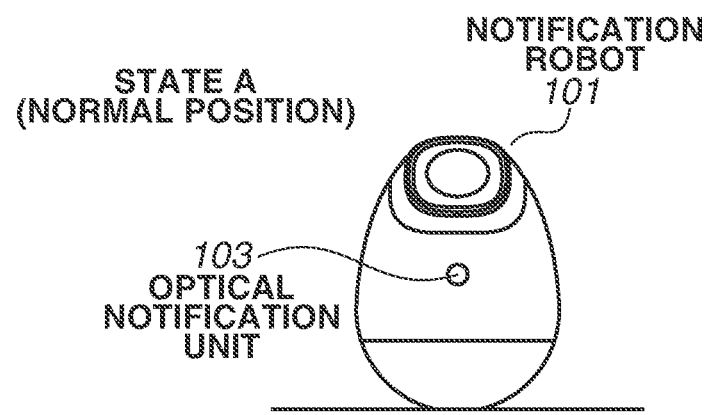
STATE A
(NORMAL POSITION)
NOTIFICATION ROBOT
101
103
OPTICAL NOTIFICATION UNIT
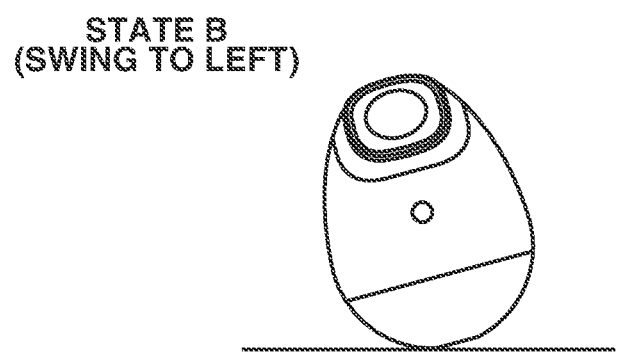
STATE B
(SWING TO LEFT)
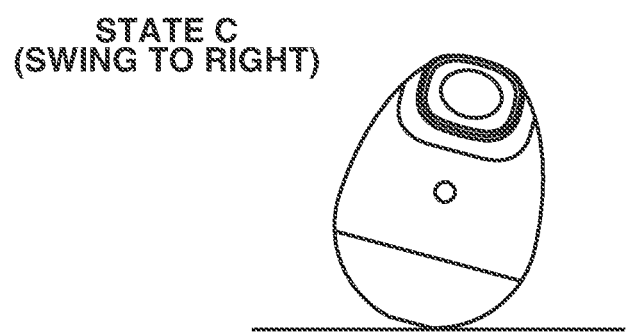
STATE C
(SWING TO RIGHT)

ELECTRONIC DEVICE AND CONTROL METHOD THEREOF

BACKGROUND

Field of the Disclosure

The present disclosure relates to an electronic device and a control method of the electronic device, and more particularly to a technique for notifying a user about a posture.

Description of the Related Art

There is a technique for determining whether a posture of the user deviates from the ideal posture. Japanese Patent Application Laid-Open No. 2017-4464 discusses a technique in which an image is captured when the user is in a predetermined posture, determination of whether the user has a target posture is performed, and notification of a result of the determination is given.

The technique discussed in Japanese Patent Application Laid-Open No. 2017-4464 may not determine whether the posture is ideal, in a case where the positions of the imaging unit and the user are changed.

SUMMARY

In view of the above, some embodiments are directed to an electronic device capable of performing a notification about the posture of the user regardless of a positional relationship between the electronic device and the user.

According to an aspect of some embodiments, there is provided an electronic device includes an acquiring unit configured to acquire a positional relationship between a subject and the electronic device, a posture information acquiring unit configured to acquire a posture information of the subject, a normalization unit configured to normalize the posture information of the subject based on the positional relationship between the subject and the electronic device, and a controlling unit configured to perform control to perform predetermined notification in a case where the posture information of the subject that is normalized by the normalization unit satisfies a predetermined condition, and control not to perform the predetermined notification in a case where posture information of the subject that is normalized by the normalization unit does not satisfy the predetermined condition.

Further features of various embodiments will become apparent from the following description of exemplary embodiments with reference to the attached drawings.

BRIEF DESCRIPTION OF THE DRAWINGS

FIG. 5 is a diagram illustrating an example of the movement of the notification robot according to the present exemplary embodiment.

DESCRIPTION OF THE EMBODIMENTS

Hereinafter, some exemplary embodiments will be described with reference to the drawings.

Figure 1A:
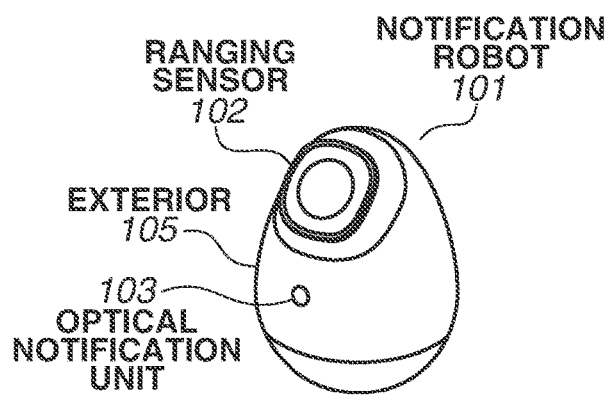
FIGS. 1A to 1C are diagrams illustrating external views of a notification robot.
Figure 1B:
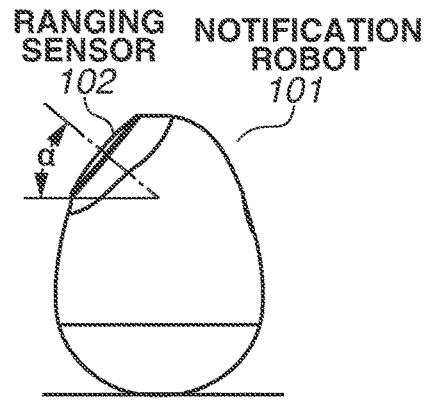
Figure 1C:
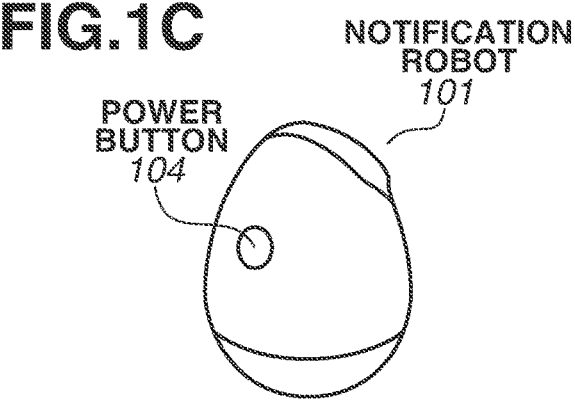

FIGS. 1A to 1C are external views of a notification robot 101 as an example of the electronic device according to the present exemplary embodiment.

FIG. 1A is a front perspective view, FIG. 1B is a left side view, and FIG. 1C is a rear perspective view.

In FIG. 1A, an exterior 105 of the notification robot 101 is composed of a resin molded product having a substantially spherical shape (a substantially spherical or curved surface) in the lower portion.

A ranging sensor 102 is provided on an upper part of the front surface of the notification robot 101, and measures the distance from the notification robot 101 to an optional part of the user.

In FIG. 1B, the ranging sensor 102 is configured to have an elevation angle α, and therefore an image of the upper body of the user can be captured when the notification robot 101 is placed on a desk and used. Here, a may preferably be 20° to 50°.

An optical notification unit 103 is a semi-transmissive portion of a main body of the notification robot 101, and transmits the light of an internal light source in a manner visible to the user.

In FIG. 1C, a power button 104 is provided on the back surface of the main body of the notification robot 101, and the power of the notification robot 101 can be switched on/off in response to the user pressing the power button 104.

Figure 1D:
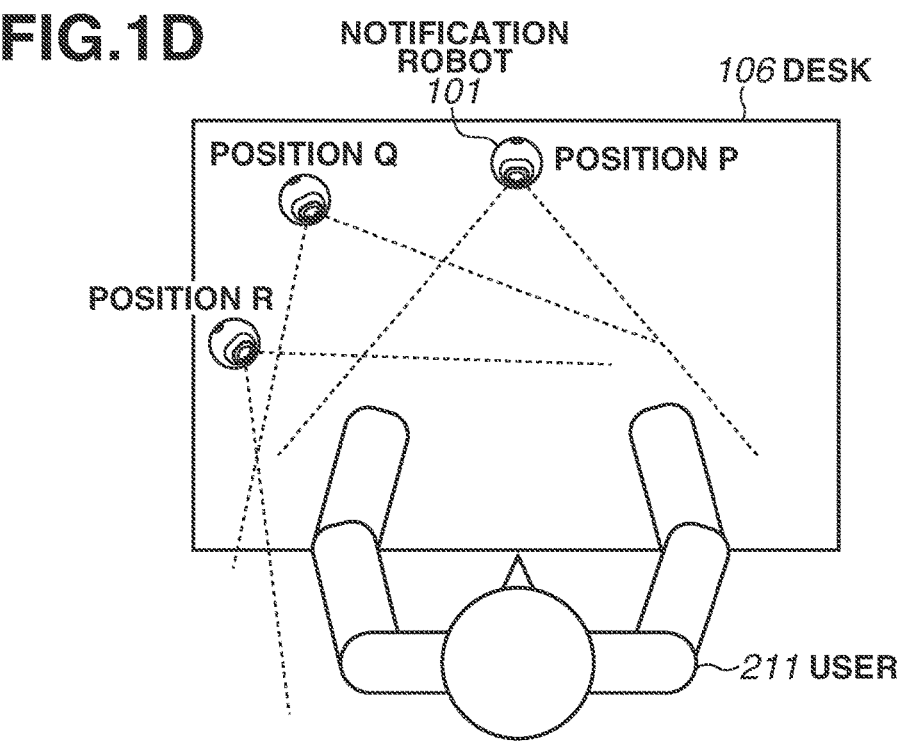
FIG. 1D is a diagram illustrating a top view for explaining an installation position of a notification robot 101 in use.

FIG. 1D is a diagram illustrating a top view for explaining an installation position of the notification robot 101 in use.

The size of the notification robot 101 is about 6 cm in diameter and about 8 cm in height, and the notification robot 101 can be installed at any position on a desk 106. For example, in a case where there is a monitor of a personal computer (PC) on the desk 106, the notification robot 101 can be disposed in front of the user and below the monitor (position P). In a case where a notebook PC is used or the notification robot 101 cannot be placed in front, the notification robot 101 can be installed in a diagonally forward direction (position Q or position R).

Figure 2:
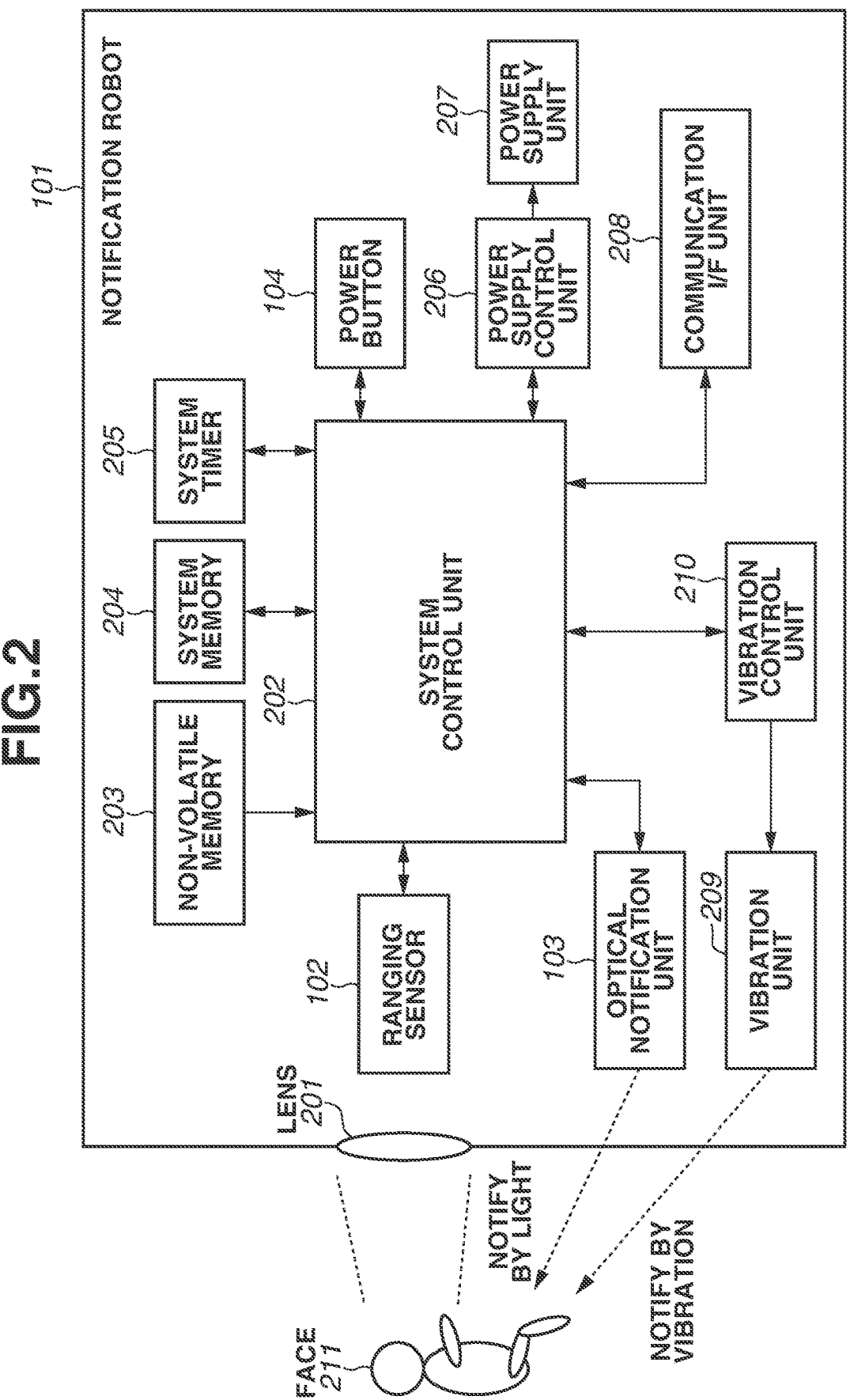
FIG. 2 is a block diagram illustrating a configuration example of the notification robot.

FIG. 2 is a diagram illustrating a configuration example of the notification robot 101 in the present exemplary embodiment.

A lens 201, which is a lens group including a plurality of lenses, is simply shown here with only one lens. The light collected by the lens 201 is guided to the ranging sensor 102. The ranging sensor 102 is an element that converts an optical image into an electrical signal, and passes the converted electrical signal (data) to a system control unit 202. The data to be passed includes the range information on a range from the ranging sensor 102 to a user 211. Further, the timing at which the ranging sensor 102 converts the optical image into an electrical signal and the like are controlled by the system control unit 202.

A non-volatile memory 203 is a memory that can be electrically erased and recorded, and, for example, a Flash-read only memory (ROM) is used in some embodiments. The non-volatile memory 203 stores constants, programs, and the like for the operation of the system control unit 202. The program referred to here is a program for executing various flowcharts described below in the present exemplary embodiment.

The system control unit 202 is a control unit including at least one processor or circuit, and controls the entire notification robot 101. By executing the program recorded in the non-volatile memory 203 described above, the system control unit 202 realizes each piece of processing of the present exemplary embodiment described below. For example, a random access memory (RAM) is used for a system memory 204, and constants and variables for operation of the system control unit 202, a program read from the non-volatile memory 203, and the like are loaded into the system memory 204. The system control unit 202 detects a person based on the data obtained from the ranging sensor 102, and extracts range information about a distance to a feature point of the person, such as a face, a right shoulder, a left shoulder, or a chest. The system control unit 202 also performs an operation using the extracted range information, and determines the posture information of the user 211. In this processing, the extracted range information and the determined posture information are recorded in the non-volatile memory 203.

A system timer 205 is a time measurement unit for measuring the time that is used for various controls and the time of a built-in clock.

The power button 104 is an operating member that switches on and off of the power of the notification robot 101. A power supply control unit 206 includes a direct current to direct current (DCDC) converter, a switch circuit for switching a block to be energized, and the like. The power supply control unit 206 controls the DCDC converter based on an instruction of the system control unit 202, and supplies the required voltage to an appropriate portion in the notification robot 101 for a necessary period. A power supply unit 207 includes a primary battery, such as an alkaline battery or a lithium battery, a secondary battery, such as a nickel-cadmium (NiCd) battery, a nickel-metal hydride (NiMH) battery, or a lithium-ion (Li) battery, an alternate current (AC) adapter, or the like.

A communication interface (I/F) unit 208 is an interface for transmitting and receiving data by being connected to an external device wirelessly or by a wired cable.

The optical notification unit 103 includes a light emitting element, such as a light emitting diode (LED), controlled by the system control unit 202. Based on the determined posture information, the system control unit 202 controls the optical notification unit 103 and notifies the user 211 of a posture determination result. Alternatively, the system control unit 202 controls the optical notification unit 103 to notify the user 211 that the reference posture of the user 211 is being acquired (calibrated).

A vibration unit 209 includes an actuator or the like, which is a mechanism for physically vibrating the notification robot 101, and is controlled by a vibration control unit 210.

The vibration control unit 210 includes a motor driver or the like, and is controlled by the system control unit 202. The vibration control unit 210 causes the notification robot 101 to vibrate with an optional amplitude in an optional cycle by controlling the presence/absence, timing, and amount of energization of the vibration unit 209.

The above is the description of the block diagram according to the exemplary embodiment. However, some embodiments are not limited to this configuration.

Next, the notification processing according to the present exemplary embodiment will be described with reference to the flowcharts of FIGS. 3 and 4. This processing is realized by the system control unit 202 executing the program recorded in the non-volatile memory 203 which is loaded into the system memory 204. In this processing, when the power button 104 of the notification robot 101 is pressed and the power is turned on and the ranging sensor 102 can be activated, the ranging sensor starts capturing an image.

In S301, the system control unit 202 starts capturing an image by the ranging sensor 102.

In S302, the system control unit 202 determines whether or not the reference posture data is recorded in the non-volatile memory 203. In a case where the reference posture data is recorded (YES in S302), the processing proceeds to S304, and otherwise (NO in S302), the processing proceeds to S303.

In S303, the system control unit 202 acquires the reference posture data. The acquisition of the reference posture data will be described below using the flowchart of the reference data acquisition processing of FIG. 4. Here, the reference posture data is the posture taken by the user after the user is notified to take a good posture. In the processing described below, determination of whether or not the current posture of the user is round-shouldered or forward or backward leaning posture is performed based on the reference posture data. Since the reference posture data is acquired, determination of whether or not the user, who has a habit of having rounded shoulders, has further rounded shoulders compared with the original habit can be performed. If standard posture data is used to determine a good posture or bad posture without acquiring reference posture data from a target user, notification described below may be frequently performed in a case where the user has a habit of a certain posture or in a case where the user keeps a certain posture to work comfortably, however, the frequency of the notification described below can be reduced using an acquired reference posture data. In the present exemplary embodiment, the round-shouldered posture or the frontward or rearward leaning posture is determined by using a difference between the posture at the time of the reference posture data and the current posture. The posture determination method is not limited to this, and a posture that is considered to be a good posture based on the user's body shape may be generated as the reference posture data.

In S304, the system control unit 202 acquires a captured image using the ranging sensor 102.

In S305, the system control unit 202 detects a person from the captured image acquired in S304 immediately before. When a plurality of people is detected, the information of the person who is closest to the notification robot 101 or appears the largest is used in S307 described below.

In S306, the system control unit 202 determines whether or not a person is detected in the captured image acquired in S305. In a case where the system control unit 202 determines that a person is detected (YES in S306), the processing proceeds to S307, and if not (NO in S306), the processing in S304 to S306 is repeated.

Figure 6A:
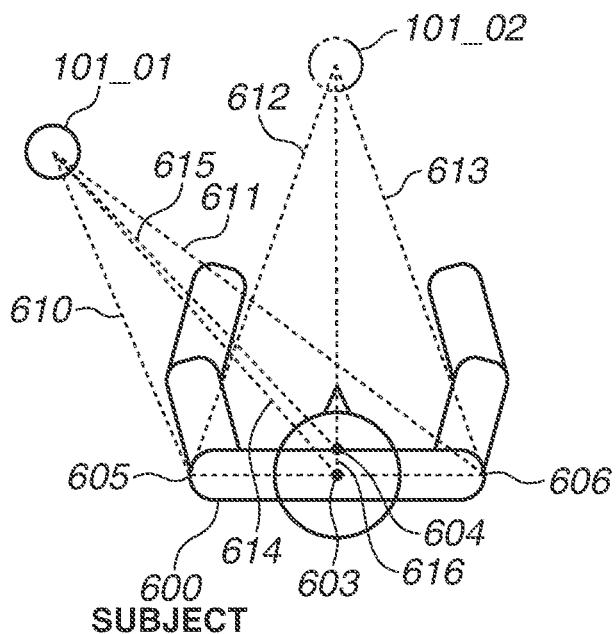
FIG. 6A is a diagram illustrating an example of a positional relationship between the user and the notification robot according to the present exemplary embodiment.
Figure 6C:
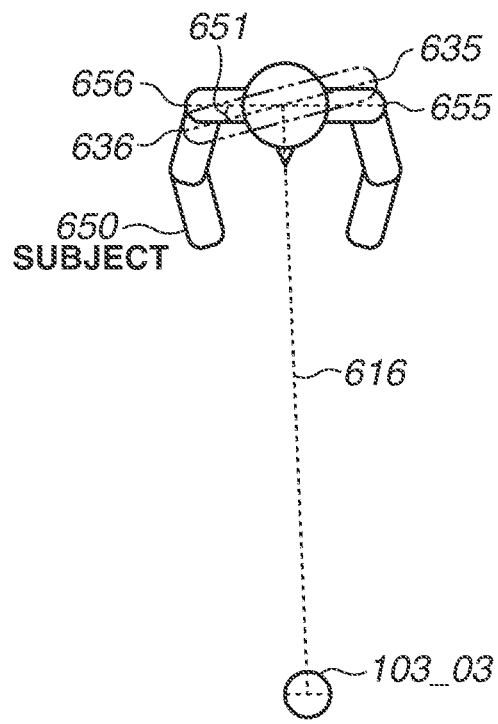
FIG. 6C is a diagram illustrating an example of normalization regarding rotation of the posture according to the present exemplary embodiment.
Figure 6B:
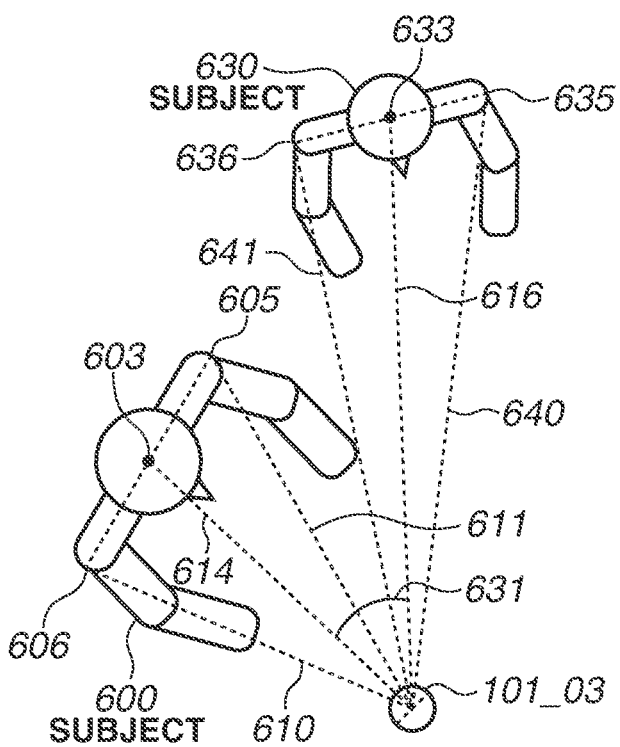
FIG. 6B is a diagram illustrating an example of normalization of a distance and an angle in the posture according to the present exemplary embodiment.

In S307, the system control unit 202 acquires subject information of the distances to the head, shoulders, and chest of the subject detected in S306. The distances to the subject's head, shoulders, and chest will be described with reference to FIGS. 6A to 6C. FIGS. 6A to 6C are top views of the notification robot 101 and a subject 600. The actual position of the notification robot 101 in FIG. 6A is 101_01, and the position when the notification robot 101 is virtually in front is 101_02. The head distance from the notification robot 101_01 to a head 603 of the subject is a distance 614. The shoulder distance from the notification robot 101_01 to a left shoulder 605 is a distance 610, and from the notification robot 101_01 to the right shoulder 606 is a distance 611. The chest distance from the notification robot 101_01 to the chest 604 is a distance 615.

In S308, the system control unit 202 normalizes the distances to the subject's face, shoulders, and chest acquired in S307 to the posture of when the notification robot 101 is directly in front of the user's face. Conversion to the data of when the notification robot 101 is placed at a specific position in the direction perpendicular to the line connecting both the shoulders 605 and 606 is performed. The specific position is 101_02 in FIG. 6A. The head distance is a distance 616 from the position of the virtual notification robot 101_02 to the head 603 of the subject. The head distance is thus converted to the distance 616 from the position of the virtual notification robot 101_02 to the head 603 of the subject.

Here, a specific conversion method for normalization will be described with reference to FIG. 6B. It is necessary to perform correction regarding a distance and an angle, and correction of the rotation of the subject. First, the correction regarding a distance will be described.

A virtual subject 630 of FIG. 6B is an image of the subject 600 captured by the virtual notification robot 101_02 of FIG. 6A, in which the left shoulder 605 and the right shoulder 606 are not corrected. A virtual notification robot 101_03 of FIG. 6B is a device in which the notification robot 101_01 of FIG. 6A and the virtual notification robot 101_02 of FIG. 6A are virtually superimposed.

In FIG. 6B, the distance 614 to the head 603 of the subject 600 and the distance 616 to a head 633 of the subject 630 form an angle 631. The direction in which the head 633 of the subject 630 and the image plane of the virtual notification robot 101_03 are orthogonal to each other is defined as a z axis, and the direction orthogonal to the z axis is defined as an x axis. Assuming that the position of the virtual notification robot 101_03 is the origin, the z coordinate of the left shoulder 606 is a coordinate $606\_z$, and the x coordinate is a coordinate $606\_x$, a z-coordinate $636\_z$ and an x-coordinate $636\_x$ of a left shoulder 636 of the virtual subject 630 can be obtained from the following:

Coordinate $636\_z$=(distance 616/distance 614)×coordinate $606\_z$×cos(angle 631)−(distance 616/distance 614)×coordinate $606\_x$×sin(angle 631), and (A)

Coordinate $636\_x$=(distance 616/distance 614)×coordinate $606\_z$×sin(angle 631)+(distance 616/distance 614)×coordinate $606\_x$×cos(angle 631). (B)

Similarly, in FIG. 6B, assuming that the position of the virtual notification robot 101_03 is the origin, the z coordinate of the right shoulder 605 is a coordinate $605\_z$, and the x coordinate is a coordinate $605\_x$, a z-coordinate $635\_z$ and an x-coordinate $635\_x$ of a left shoulder 635 of the virtual subject 630 can be obtained from the following:

Coordinate $635\_z$=(distance 616/distance 614)×coordinate $605\_z$×cos(angle 631)−(distance 616/distance 614)×coordinate $605\_x$×sin(angle 631), and (C)

Coordinate $635\_x$=(distance 616/distance 614)×coordinate $605\_z$×sin(angle 631)+(distance 616/distance 614)×coordinate $605\_x$×cos(angle 631). (D)

Next, the correction regarding the rotation of the subject will be described with reference to FIG. 6C.

A virtual subject 650 is a virtual subject after the rotation of the virtual subject 630 is corrected.

The line segment connecting a left shoulder 655 and a right shoulder 656 of the virtual subject 650 and the line segment connecting the left shoulder 635 and the right shoulder 636 of the virtual subject 630 have an angle 651. Assuming that the position of the virtual notification robot 101_03 is the origin, a z-coordinate $656\_z$ and an x-coordinate $656\_x$ of the left shoulder 656 of the virtual subject 650 can be obtained from the following:

Coordinate $656\_z$=coordinate $636\_z$×cos(angle 651)−(coordinate $636\_x$−distance 616)×sin(angle 651), and (E)

Coordinate $656\_x$=Coordinate $636\_z$×sin(angle 651)+(coordinate $636\_x$−distance 616)×cos(angle 651)+distance 616. (F)

Similarly, assuming that the position of the virtual notification robot 101_03 of FIG. 6C is the origin, a z-coordinate $655\_z$ and an x-coordinate $656\_x$ of the left shoulder 655 of the virtual subject 650 can be obtained from the following:

Coordinate $655\_z$=coordinate $636\_z$×cos(angle 651)−(coordinate $635\_x$−distance 616)×sin(angle 651), and (G)

Coordinate $655\_x$=Coordinate $636\_z$×sin(angle 651)+(coordinate $635\_x$−distance 616)×cos(angle 651)+distance 616. (H)

The order of the correction of the distance and the angle and the correction of the rotation described above can be any order. Further, the above example is two-dimensional correction when viewed from the top, and the correction is performed using a two-dimensional rotation matrix and a distance. When correction is required for the height of the subject, correction using a three-dimensional rotation matrix and a distance, which is obtained by adding correction in the height direction to the above equation, is required.

In S309, the system control unit 202 calculates a difference value Zhn between the head and the chest and a difference value Zcn between the midpoint of the line connecting both shoulders and the chest based on the values normalized in S308, and records the values in the system memory 204.

Figure 7A:
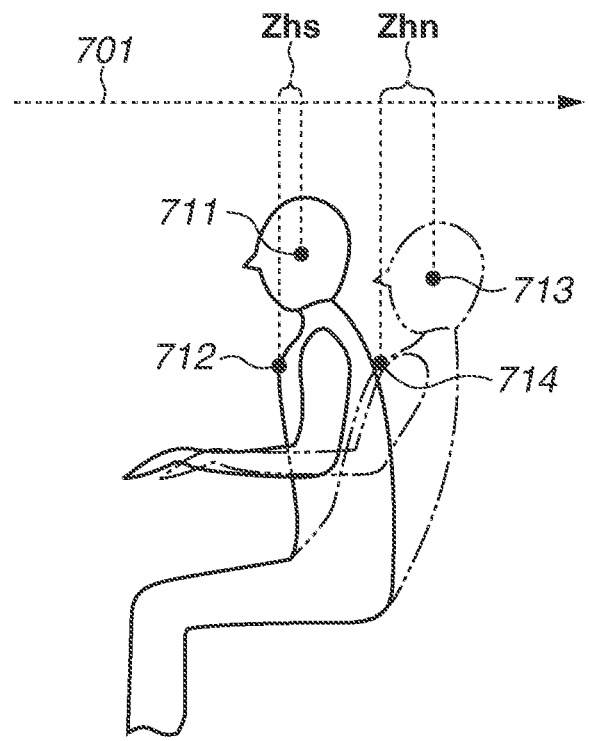
FIG. 7A is a diagram for explaining forward leaning and backward leaning postures of the user according to the present exemplary embodiment.
Figure 7B:
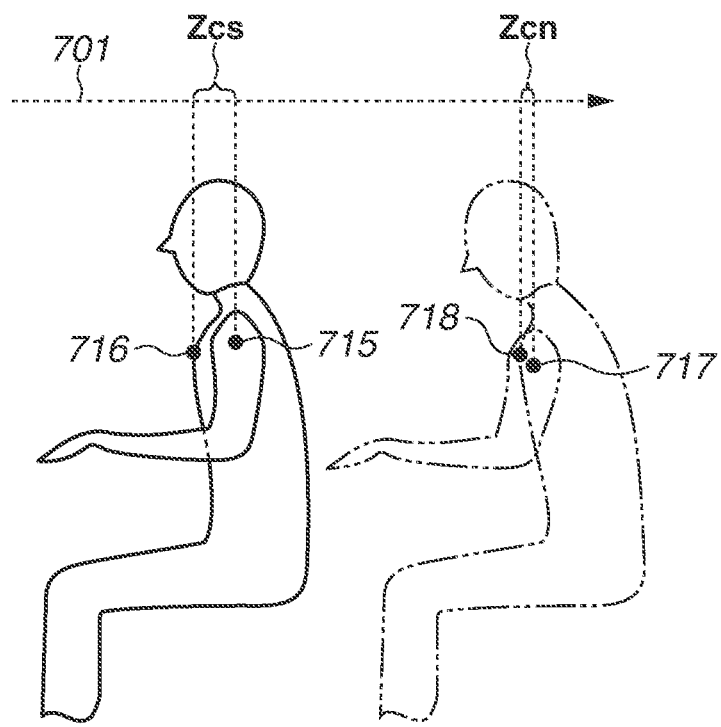
FIG. 7B is a diagram for explaining the position of a shoulder of the user according to the present exemplary embodiment.

As illustrated in FIG. 7A, a difference value Zhs between a head 711 and a chest 712 in the reference posture is obtained, and in one example of the posture when the notification processing is performed, the difference value Zhn between a head 713 and a chest 714 is obtained. A coordinate axis 701 is positive in a direction away from the notification robot 101. If Zhn is smaller than Zhs (negative value), that is, when the head comes forward significantly further than the chest, the posture is determined to be a forward leaning posture. If Zhn is larger than Zhs, the posture is determined to be a backward leaning (swayback) posture. As illustrated in FIG. 7B, a difference value Zcs between a midpoint 715 of the line connecting both shoulders and the chest 716 in the reference posture is obtained, and in one example when the notification processing is performed, a difference value Zcn between a midpoint 717 of the line connecting both shoulders and a chest 718 is obtained. If Zcn is smaller than Zcs (negative value), the posture is determined as a round-shouldered posture.

In S310, the system control unit 202 compares the difference value Zhs between the head and the chest in the reference posture acquired in S303, the difference value Zcs between the midpoint of the line connecting both shoulders and the chest, and Zhn and Zcn acquired in S309. That is, Zhs is compared with Zhn, and Zcs is compared with Zcn.

In S311, the system control unit 202 determines whether any of the conditions (I) Zhn−Zhs<x1 and (II) Zhn−Zhs>x2 is satisfied, or whether neither of the conditions is satisfied. That is, in (I), it is possible to determine whether or not the posture is a forward leaning posture (stoop). For example, x1 is a value such as −6 cm, −8 cm, or −10 cm. In (II), it is possible to determine whether or not the posture is a backward leaning posture (swayback). For example, x2 is a value such as 2 cm, 4 cm, or 6 cm.

In a case where it is determined that either (I) or (II) is established (YES in S311), the processing proceeds to S312, and if not (NO in S311), the processing proceeds to S315. Any values may be set for x1 and x2 by the user, or x1 and x2 may be automatically changed according to a profile (age, gender, or physique) of the user that is input. For example, in a case where a shoulder width is detected and the shoulder width is large, x1 and x2 are changed to larger values by, for example, 2 cm and 3 cm. Alternatively, in a case where the gender is female, x1 and x2 are changed to smaller values by, for example, 2 cm or 3 cm.

In S312, the system control unit 202 starts a measurement of a count T1 of the forward/backward leaning posture. T1 indicates the time during which the state in which the user's posture is leaning forward or swayback compared with the reference posture is continued. In a case where the measurement of T1 has already started, the measurement is continuously performed in S312.

In S313, the system control unit 202 determines whether or not the count T1 of the forward/backward leaning posture is five minutes or more. If the system control unit 202 determines that T1 is five minutes or more (YES in S313), the processing proceeds to S314, and if not (NO in S313), the processing proceeds to S316.

In S314, the system control unit 202 notifies the user that the user's posture is in a forward/backward leaning state. The method of the notification is that the system control unit 202 controls the vibration control unit 210 to vibrate the notification robot 101 with an optional amplitude in an optional cycle. The notification method may be changed depending on whether the state of leaning forward is continuing or the state of being swayback is continuing.

In S315, the system control unit 202 resets the forward/backward leaning posture time T1 to zero. That is, in a case where the user, who has been temporarily in a leaning forward or swayback state, returns to a posture close to the reference posture before a lapse of five minutes, T1 is reset.

In S316, the system control unit 202 determines whether or not the condition (III) Zcn−Zcs<x3 is satisfied. That is, in (III), whether or not the posture is round-shouldered can be determined. For example, x3 is a value such as −1.0 cm, −1.5 cm, or −2.0 cm. The value x3 may be optionally set by the user, or may be automatically changed according to a profile (age, gender, or physique) of the user that is input. For example, in a case where a shoulder width is detected and the shoulder width is large, x3 is changed to a larger value. Alternatively, in a case where the gender is female, x3 is changed to a smaller value.

In this way, since the z coordinate of the chest is used for all of Zhn, Zhs, Zcn, and Zcs, it is necessary to detect the position of the chest of the user from the notification robot 101. Therefore, the angle 651 in FIG. 6C, that is, the angle formed by the z-axis plane of the notification robot 101 and the left and right shoulders of the user who is the subject is desirably in the range of about −80° to +80°. Within that range, the notification robot 101 can be installed at any position for the user.

In a case where it is determined that (III) is established (YES in S316), the processing proceeds to S317, and if not (NO in S316), the processing proceeds to S320.

In S317, the system control unit 202 starts measurement of a count T2 for the round-shouldered posture. T2 indicates the time during which the state in which the user's posture is round-shouldered compared with the reference posture is continued. In a case where measurement of T2 has already started, the measurement is continuously performed in S317.

In S318, the system control unit 202 determines whether or not the count T2 of the round-shouldered posture is five minutes or more. If it is determined that T2 is five minutes or more (YES in S318), the processing proceeds to S319, and if not (NO in S318), the processing proceeds to S321.

In S319, the system control unit 202 notifies the user that the user's posture is in a round-shouldered state. The method of the notification is that the system control unit 202 controls the vibration control unit 210 to vibrate the notification robot 101 with an optional amplitude in an optional cycle.

In S320, the system control unit 202 resets the round-shouldered posture time T2 to zero. That is, in a case where the posture of the user, who has temporarily rounded shoulders, returns to a posture close to the reference posture before a lapse of five minutes, T2 is reset.

In S321, the system control unit 202 determines whether or not the user stands up. If it is determined that the user stands up (YES in S321), the processing proceeds to S322, and if not (NO in S321), the processing proceeds to S323.

In S322, the system control unit 202 resets a seated time T3, which will be described below.

In S323, the system control unit 202 starts or continues measurement of the seated time T3. The seated time T3 is the time for detecting that the user is continuously sitting. The measurement of T1, T2, and T3 is performed by the system timer 205.

In S324, the system control unit 202 determines whether or not the seated time T3 is 30 minutes or more. If it is determined that T3 is 30 minutes or more (YES in S324), the processing proceeds to S325, and if not (NO in S324), the processing proceeds to S326.

In S325, the system control unit 202 notifies the user that the user is sitting for too long. The method of the notification is that the system control unit 202 controls the vibration control unit 210 to vibrate the notification robot 101 with an optional amplitude in an optional cycle.

Here, various notification methods of the notification robot 101 will be described with reference to FIG. 5.

In FIG. 5, the states of the notification robot 101 are A (normal position), B (left swing), and C (right swing).

In a notification pattern 1, the state transition is made in the order of state A→B→C→A→stopped for one second→B→C→A→stopped. As the notification robot 101 swings to the left and right, the user can easily check the notification even when the notification robot 101 is placed on the desk.

In a notification pattern 2, the state transition is made in the order of state A→B→C→B→C→B→C→A→stopped.

In a notification pattern 3, the optical notification unit 103 blinks twice at 2 Hz while the notification robot 101 remains in the state A.

In a notification pattern 4, the optical notification unit 103 lights up once for two seconds while the notification robot 101 remains in the state A.

In a notification pattern 5, the optical notification unit 103 blinks three times at 1 Hz while the notification robot 101 remains in the state A.

In a notification pattern 6, the optical notification unit 103 lights up brightly once for one second while the notification robot 101 remains in the state A.

Figure 3:
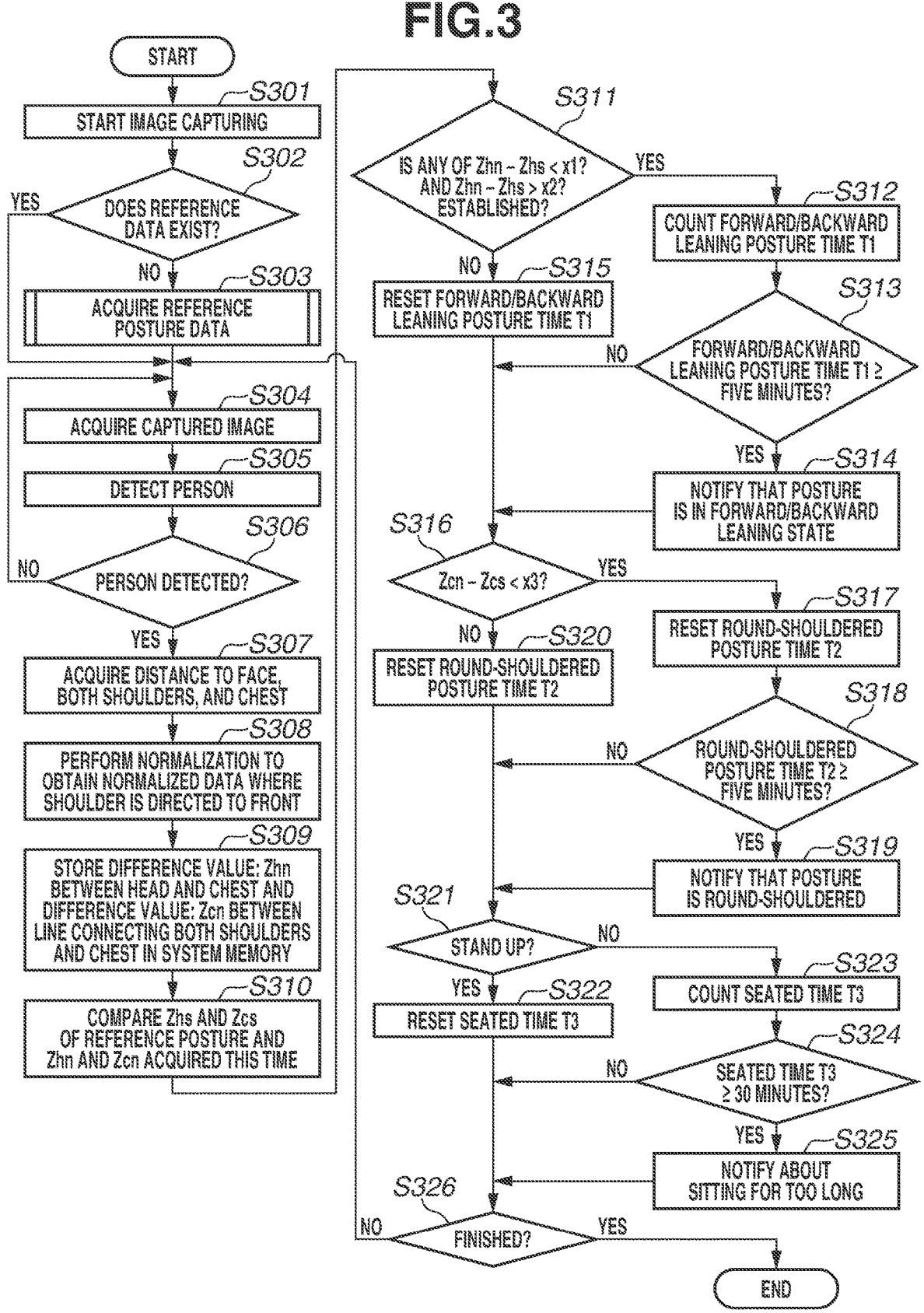
FIG. 3 is a flowchart of notification processing according to the present exemplary embodiment.
Figure 4:
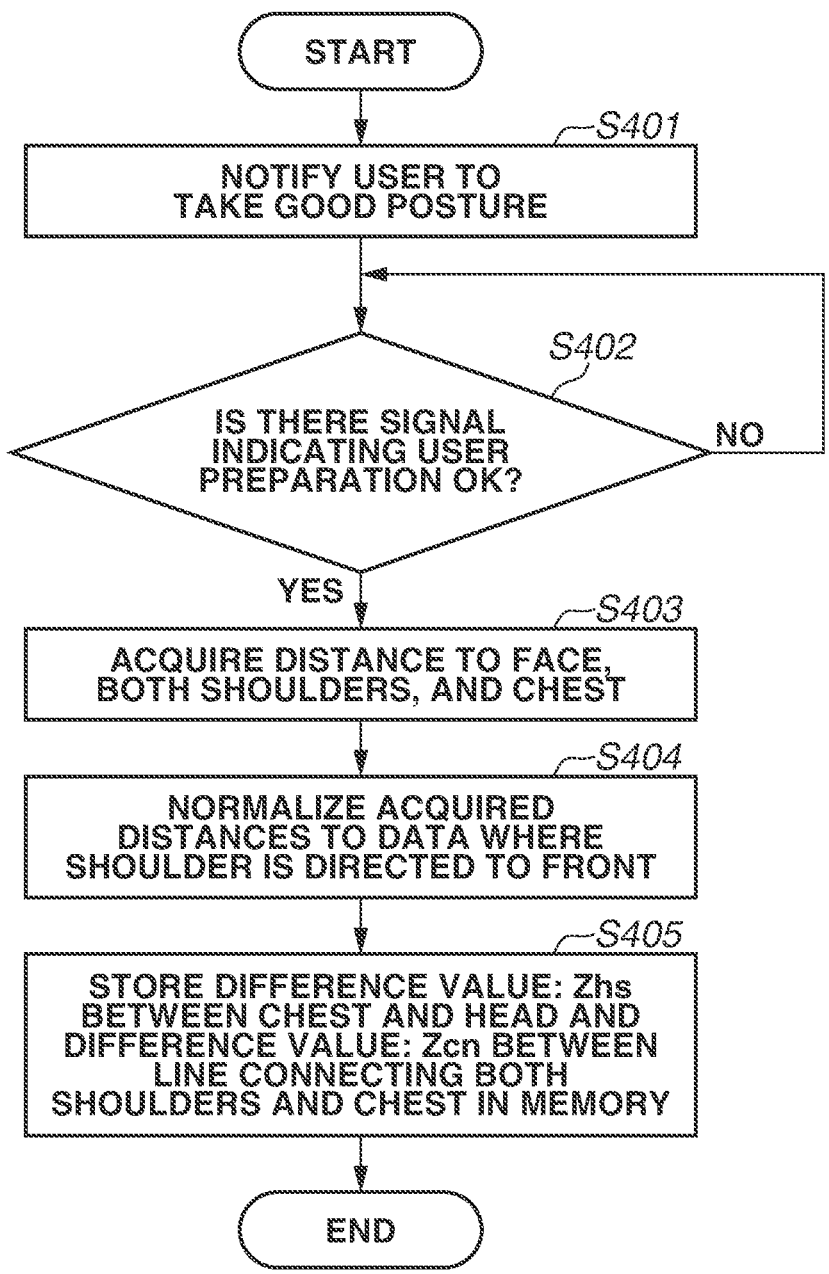
FIG. 4 is a flowchart of reference posture data acquisition processing according to the present exemplary embodiment.

The notification pattern 1 is used in the notification of S314 for the forward/backward leaning state and the notification of S319 for the round-shouldered state in FIG. 3. The notification pattern 2 is used in the over-sitting notification of S325.

The notification pattern 3 is used as a notification when the power button 104 is pressed and the image capturing of the notification robot 101 is started in S301.

The notification pattern 4 is used as a notification when a person is detected in S305. This notification pattern is used in a similar way when a person is detected again after standing-up of the user is detected (S321) once in the over-sitting detection of S325.

In S326, the system control unit 202 determines whether or not the power of the notification robot 101 is turned off. In a case where the system control unit 202 determines that the power is turned off (YES in S326), the process illustrated in FIG. 3 ends, and if not (NO in S326), the processing returns to S304. In S326, the determination may be YES when the power of the personal computer (PC) that is used by the user is turned off, or may be YES when a predetermined time is reached.

Next, a flowchart for acquiring the reference posture data will be described with reference to FIG. 4. This processing starts when the processing proceeds to S303 in FIG. 3.

In S401, the system control unit 202 controls the optical notification unit 103 to notify the user to take the reference posture. In this processing, the notification pattern 5 is used for notification.

In S402, the system control unit 202 waits for a signal indicating that the user preparation is OK. The user preparation is determined to be OK in a case where the power button 104 is long-pressed. Examples of the sign for OK from the user include a gesture, such as the user raising both hands, which may be used as an OK sign.

In S403, the system control unit 202 acquires the distances to the head, both shoulders, and the chest as the reference posture of the detected subject. In this processing, notification that acquisition of the reference posture is successful is performed using the notification pattern 6.

In S404, the system control unit 202 normalizes the distances to the face, shoulders, and chest, which are the references of the subject acquired in S403, to the posture of when the notification robot 101 is directly in front of the user's face.

In S405, the system control unit 202 calculates the difference value Zhs between the line connecting both shoulders and the head and the difference value Zcs between the line connecting both shoulders and the chest, based on the value normalized in S404, and records the values in the non-volatile memory 203.

According to the exemplary embodiment described above, the posture of the user can be notified regardless of the arrangement position of the notification robot 101. Further, since the notification is performed by swinging of the main body which is different from a notification on a screen or a notification from an application, the notification effect can be easily obtained.

While, in S314, S319, and S325, the notification to the user by operation of the notification robot 101 is described, the communication I/F section 208 may be used to perform notification to a smartphone or an application in the PC of the user that supports the communication. Furthermore, information on the posture of the user may be recorded in an application, and shown in a graph or numerically shown, to make it easier for the user to grasp the tendency and habit of the posture of the user. For example, in a case where working days are from Monday to Friday, if the number of notifications for a backward leaning posture increases toward Friday, the user can consciously correct the user's posture.

While the notification method is described as one in which notification is performed with the movement or light of the notification robot 101, a display unit may be blinked or push notification may be performed to issue a warning in the case of a smartphone.

While the notification robot 101 according to the present exemplary embodiment detects the posture based on the ranging sensor 102, the posture may be detected by a visible light imaging sensor that does not measure the distance. In that case, the range information is estimated from the captured image obtained by the imaging sensor. The above-mentioned various controls described as those performed by the system control unit 202 may be performed by one piece of hardware, or the entire device may be controlled by a plurality of pieces of hardware sharing the processing.

While some embodiments are described in detail, some embodiments are not limited to these specific exemplary embodiments, and various embodiments within the scope of the gist of the present disclosure are also included. Furthermore, each of the above-described embodiments is an exemplary embodiment, and each exemplary embodiment can be combined as appropriate.

Further, the above-described exemplary embodiment is described by taking the case where the present disclosure is applied to the notification robot 101, as an example. However, some embodiments are not limited to this example, and can be applied to any electronic device as long as the electronic device can acquire information on the positional relationship between the user and the device and the posture. That is, the present disclosure can be applied to a mobile phone terminal, a portable image viewer, a printer device including a viewfinder, a digital photo frame, a music player, a game machine, an electronic book reader, and the like.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2020-029740, which was filed on Feb. 25, 2020 and which is hereby incorporated by reference herein in its entirety.

What is claimed is:

1. An electronic device comprising:
a first acquiring unit configured to acquire a captured image by capturing a subject;
a detecting unit configured to detect a person from the captured image;
a second acquiring unit configured to acquire distances from the electronic device to each of a head, shoulders and chest of the person;
a normalization unit configured to normalize the distances from the electronic device to each of the head, shoulders and chest of the person so that a positional relationship between the electronic device and the person is such that the electronic device is in front of a face of the person;
a calculation unit configured to calculate a difference value between the normalized distance from the electronic device to the head of the person and the normalized distance from the electronic device to the chest of the person, and a difference value between the normalized distance from the electronic device to the shoulders of the person and the normalized distance from the electronic device to the chest of the person; and
a controlling unit configured to perform control to perform predetermined notification in a case where a result of the calculation satisfies a predetermined condition, and control not to perform the predetermined notification in a case where the result of the calculation does not satisfy the predetermined condition.

2. The electronic device according to claim 1, further comprising:
a posture information acquiring unit configured to acquire values of a reference posture,
wherein the controlling unit performs control to perform the predetermined notification in a case where a result of comparison between the values of the reference posture and the result of the calculation satisfies the predetermined condition.

3. The electronic device according to claim 1,
wherein the second acquiring unit acquires the distances by measuring using a ranging sensor.

4. The electronic device according to claim 1,
wherein a case where the result of the calculation satisfies the predetermined condition is a case where the person is in a predetermined posture, and wherein the predetermined posture is at least one of a forward leaning posture, a backward leaning posture, and round-shouldered posture.

5. The electronic device according to claim 1,
wherein the controlling unit performs notification in a case where the person is sitting for a predetermined time or longer.

6. The electronic device according to claim 1,
wherein the predetermined notification is performed by swinging of the electronic device.

7. The electronic device according to claim 4,
wherein the controlling unit controls to change a notification method between a case where the posture of the person is determined to be the forward leaning posture or the backward leaning posture and a case where the posture of the person indicates the round-shouldered posture.

8. The electronic device according to claim 6,
wherein the electronic device has a substantially spherical or a curved surface in a lower portion.

9. The electronic device according to claim 4,
wherein the posture of the person is determined based on the result of the calculation.

10. A control method of an electronic device, the control method comprising:
acquiring a captured image by capturing a subject;
detecting a person from the captured image;
acquiring distances from the electronic device to each of a head, shoulders and chest of the person;
normalizing the distances from the electronic device to each of the head, shoulders and chest of the person so that a positional relationship between the electronic device and the person is such that the electronic device is in front of a face of the person;
calculating a difference value between the normalized distance from the electronic device to the head of the person and the normalized distance from the electronic device to the chest of the person, and a difference value between the normalized distance from the electronic device to the shoulders of the person and the normalized distance from the electronic device to the chest of the person; and
controlling to perform predetermined notification in a case where a result of the calculation satisfies a predetermined condition, and controlling not to perform the predetermined notification in a case where the result of the calculation does not satisfy a predetermined condition.

11. A non-transitory computer-readable storage medium that stores a program for causing a computer to execute the control method of an electronic device, the control method comprising:
acquiring a captured image by capturing a subject;
detecting a person from the captured image;
acquiring distances from the electronic device to each of a head, shoulders and chest of the person;
normalizing the distances from the electronic device to each of the head, shoulders and chest of the person so that a positional relationship between the electronic device and the person is such that the electronic device is in front of a face of the person;
calculating a difference value between the normalized distance from the electronic device to the head of the person and the normalized distance from the electronic device to the chest of the person, and a difference value between the normalized distance from the electronic device to the shoulders of the person and the normalized distance from the electronic device to the chest of the person; and controlling to perform predetermined notification in a case where a result of the calculation satisfies a predetermined condition, and controlling not to perform the predetermined notification in a case where the result of the calculation does not satisfy a predetermined condition.

12. An electronic device comprising:

one or more computer-readable storage media; and one or more processors, wherein the one or more processors and the one or more computer-readable storage media are configured to:

acquire a captured image that was generated by capturing a subject;

detect a person from the captured image;

acquire distances from the electronic device to each of a head, shoulders and chest of the person;

normalize the distances from the electronic device to each of the head, shoulders and chest of the person so that a positional relationship between the electronic device and the person is such that the electronic device is in front of a face of the person;

calculate a difference value between the normalized distance from the electronic device to the head of the person and the normalized distance from the electronic device to the chest of the person, and a difference value between the normalized distance from the electronic device to the shoulders of the person and the normalized distance from the electronic device to the chest of the person; and perform control to perform a predetermined notification in a case where a result of the calculation satisfies a predetermined condition, and control not to perform the predetermined notification in a case where the result of the calculation does not satisfy the predetermined condition.

13. The electronic device according to claim 12, wherein the one or more processors and the one or more computer-readable storage media are further configured to:

acquire values of a reference posture; and perform control to perform the predetermined notification in a case where a result of comparison between the values of the reference posture and the result of the calculation satisfies the predetermined condition.

14. The electronic device according to claim 12, wherein the one or more processors and the one or more computer-readable storage media are further configured to acquire the distances by measuring using a ranging sensor.

15. The electronic device according to claim 12, wherein a case where the result of the calculation satisfies the predetermined condition is a case where the person is in a predetermined posture, and wherein the predetermined posture is at least one of a forward leaning posture, a backward leaning posture, and round-shouldered posture.

16. The electronic device according to claim 15, wherein the one or more processors and the one or more computer-readable storage media are further configured to control to change a notification method between a case where the posture of the person is determined to be the forward leaning posture or the backward leaning posture and a case where the posture of the person indicates the round-shouldered posture.

17. The electronic device according to claim 15, wherein the posture of the person is determined based on the result of the calculation.

18. The electronic device according to claim 12, wherein the one or more processors and the one or more computer-readable storage media are further configured to perform notification in a case where the person is sitting for a predetermined time or longer.

19. The electronic device according to claim 12, wherein the predetermined notification is performed by swinging of the electronic device.

20. The electronic device according to claim 19, wherein the electronic device has a substantially spherical or a curved surface in a lower portion.

* * * * *